United States Patent [19]
Hoyecki

[11] 3,921,223
[45] Nov. 25, 1975

[54] AIR SHIELD FOR WELDERS AND OTHER CRAFTSMEN EXPOSED TO NOXIOUS FUMES

[76] Inventor: David V. Hoyecki, 394 Boynton Ave., San Jose, Calif. 97117

[22] Filed: June 12, 1974

[21] Appl. No.: 478,722

[52] U.S. Cl. .............. 2/8; 2/9; 2/DIG. 1; 128/145 R
[51] Int. Cl.² ................................ A61F 9/06
[58] Field of Search .......... 2/5, 8, DIG. 1, 9, 14 N; 128/142.5, 142.7, 145 R, 145 A; 55/DIG. 29

[56] References Cited
UNITED STATES PATENTS

| 2,333,054 | 10/1943 | Sullivan | 128/145 R |
| 2,410,593 | 11/1946 | Wright | 128/145 R |
| 2,444,393 | 6/1948 | Woo | 2/9 |
| 2,469,273 | 5/1949 | Parker | 2/8 |
| 2,818,859 | 1/1958 | Peterson | 2/9 |
| 3,683,907 | 8/1972 | Cotabish | 128/145 R |
| 3,820,536 | 6/1974 | Anspach, Jr. et al. | 128/132 R |

Primary Examiner—Werner H. Schroeder
Assistant Examiner—Conrad L. Berman
Attorney, Agent, or Firm—Eugene D. Farley

[57] ABSTRACT

An air shield comprises a hollow tube perforated along its length and contoured to encircle the neck. Means are provided for connecting the tube to a source of air under pressure. The tube openings are arranged to direct jets of air outwardly to form an air shield or curtain which disperses the fumes and protects the operator.

6 Claims, 4 Drawing Figures

U.S. Patent   Nov. 25, 1975   3,921,223
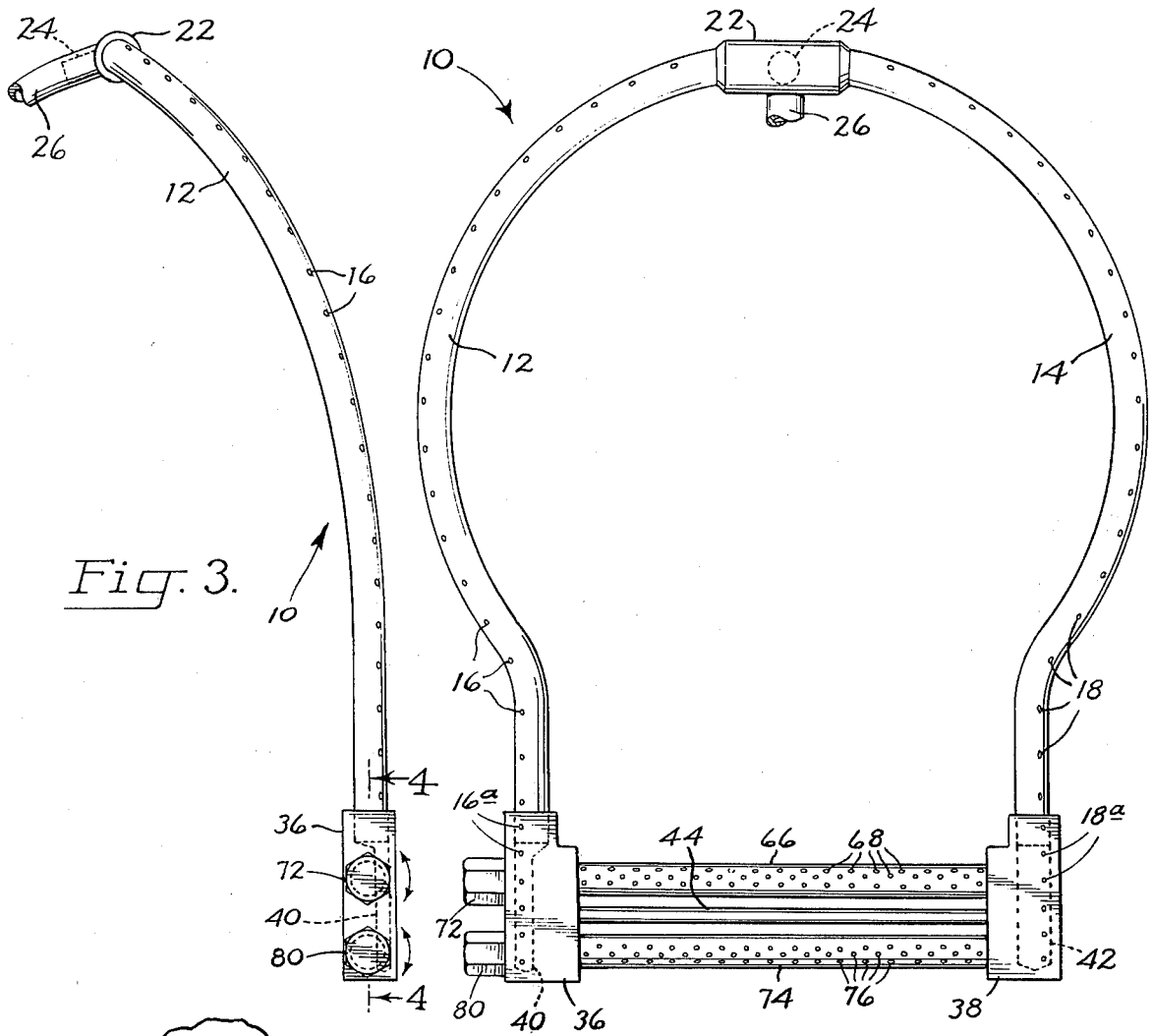
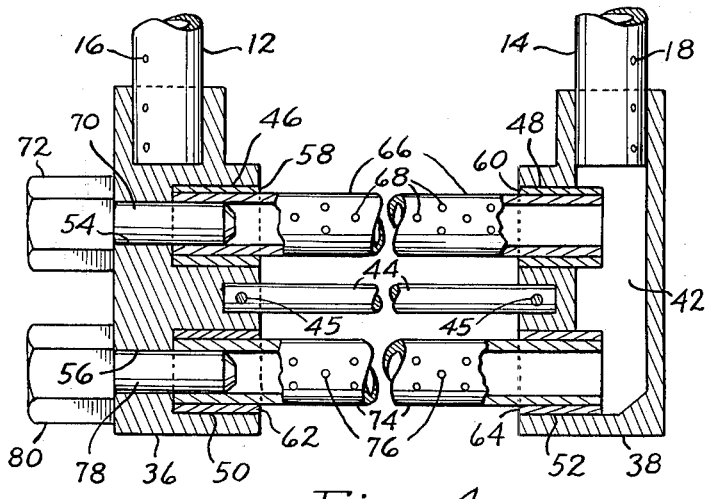

AIR SHIELD FOR WELDERS AND OTHER CRAFTSMEN EXPOSED TO NOXIOUS FUMES

BACKGROUND OF THE INVENTION

During welding operations there are produced large quantities of fumes and vapors which are both irritating and poisonous to the welder. Such fumes are a particular hazard when the welder is working in a confined space, as often is the case.

Similarly, in the operation of metal cutting pantographs, in unloading pulverulent bauxite ore or other cargo from the holds of ships, in woodworking plants, and in many other industrial situations the workers are subjected to environments heavily polluted with noxious fumes and dusts which may cause them great injury if inhaled, or permitted to come in contact with the skin.

In the case of welders, the situation is aggravated by the fact that these craftsmen conventionally wear welders' hoods equipped with windows for the purpose of protecting the eyes from the harmful effects of ultraviolet light and the face from burns resulting from flying sparks and bits of molten metal. The application of such hoods increases the aggravation and hazard from contact with noxious fumes because the fumes tend to collect in the dead air space behind the hoods unless special means are provided to dissipate them.

It has been proposed to provide such means in the form of air jets positioned within the hood and directed across the face of the welder. However, air jets within the hood produce an unpleasant hissing sound. Also, combining an air jet system with a welder's hood produces an aggregation which is heavy, hot, cumbersome, restrictive of freedom of movement, and is not effective when the welder raises his hood.

In the latter connection it should be noted that after making a weld the welder often will raise his welding hood to check welding quality, position the parts to be welded to the assembly, or position himself for making the next weld. During the time when his hood is raised, he is plagued with fumes rising from the previously made weld. It is in this situation that exposure to the welding fumes is the greatest and most troublesome.

It accordingly is the general object of the present invention to provide an air shield for welders and like craftsmen exposed to noxious fumes and dusts which shield is separate from the welder's hood and accordingly is not subject to the foregoing deficiencies of the prior art ventilated hoods.

It is a further object of the present invention to provide an air shield which is light weight and can be worn comfortably about the neck, while at the same time providing a curtain of air of variable intensity which may be subject to precise control to meet whatever conditions a welder may encounter.

Another object of the present invention is the provision of a welder's air shield which effectively protects the face of the welder from noxious fumes irrespective of whether his hood is in the lowered or raised position.

Another object of the present invention is the provision of an air shield employing pressurized air which may be disconnected from the air source rapidly and easily when the welder is performing a task other than welding, such as fitting, lay-out work, and set-up operations.

Another object of this invention is the provision of an air shield which is highly efficient in dispersing irritating and poisonous fumes and dusts so that they are not inhaled by the operator, and do not come into contact with his face and respiratory membranes.

Still another object of the present invention is the provision of an air shield which is simple in construction, inexpensive to manufacture, easily operated, and adaptable for use in a wide variety of industrial situations.

SUMMARY OF THE INVENTION

The foregoing and other objects of the present invention are accomplished by the provision of an air shield for welders and other craftsmen exposed to dangerous vapors which comprises a conduit preferably shaped as a yoke dimensioned to encircle the neck with the open end pointed forwardly. The conduit is perforated along its length and is connected through a flexible tube and a suitable valve to a source of air under pressure. Quick disconnect means permit facile connection and separation of the tube after periods of use and non-use.

A transverse pipe having along its length one or more rows of perforations spans the open end of the yoke and communicates with its interior. Rotatable mounting means mount the pipe so that it may be rotated as required to direct the air stream at any desired angle with respect to the body of the operator.

When the air shield is connected and operating, it furnishes from all of its openings a multiplicity of jets of air. These are directed to form an air shield which screens the face of the wearer from the fumes he seeks to avoid, and disperses the fumes so that they no longer present a hazard.

THE DRAWINGS

FIG. 1 is a perspective view illustrating the hereindescribed air shield as worn by a welder equipped also with a welder's hood;

FIG. 2 is a plan view and FIG. 3 is a side elevation, respectively, of the air shield; and FIG. 4 is a fragmentary, enlarged, sectional view taken along line 4—4 of FIG. 3 and illustrating the means employed for adjusting the direction of application of the air shield.

DESCRIPTION OF THE PREFERRED EMBODIMENT

As shown in FIGS. 2 and 3, the hereindescribed air shield comprises a conduit indicated generally at 10 dimensioned and contoured to be worn about the neck of an operator exposed to noxious fumes. The conduit preferably assumes the shape of a yoke formed in one piece or in two substantially identical halves 12, 14. The yoke has an enlarged inner portion which circles the neck and a projecting outer portion open at the end and directed outwardly a short distance forwardly of the wearer.

Yoke components 12, 14 are hollow, and are provided with a plurality of perforations or vents 16, 18, respectively. These are arranged in a row and are designed to direct air jets outwardly in the form of a screen or shield.

Connecting means are provided for connecting the yoke to a source of air under pressure. Such means include a coupler and/or reinforcing member 22 which couples the inner ends of yoke components 12, 14. The coupler is provided with a rearwardly extending nipple 24 which is designed to engage the end of a tube 26.

Whereas yoke components 12 and 14 are made of a rigid material such as rigid plastic, rubber, or even metal pipe, tube 26 is made of a flexible plastic or rubber material of relatively light weight. It connects with a source of air under pressure through a suitable assembly which includes a second flexible conduit 28, incorporating a standard air filter and pressure regulator, not illustrated, and a standard on-off valve indicated at 30 in FIG. 1.

The latter valve is operated by means of a lever 32 and is fitted with a clip 34 designed to clip over the belt of the operator to support the weight of tube 28 as the operator moves about the work floor.

It is a particular feature of the invention that the air shield may be disconnected from the air source when the operator wishes to be able to move freely about for work other than welding. When this is the case, he may simply disconnect tube 26 from on-off switch 30 in the manner indicated schematically in FIG. 1. Then when he is ready to resume welding, the connection can be reestablished quickly.

It will be noted that the direction of the jets established by perforations 16, 18 in yoke segments 12, 14 is fixed by the position of the openings. Also, these jets disperse the noxious fumes laterally and rearwardly of the operator.

Means also are provided, however, for concentrating a large number of jets in the area directly in front of the operator, where they are most needed, and for directing such jets at any desired angle upwardly or downwardly to suit the needs of a particular situation.

As illustrated in the drawings, there are provided for this purpose a pair of hollow heads 36, 38 having inwardly extending sleeves dimensioned for a press fit over the ends of yoke segments 12, 14, respectively. The heads are hollow. Head 36 is provided with a longitudinal cavity 40; head 38, with a longitudinal cavity 42. The heads are drilled with transverse orifices 16a, 18a, respectively, communicating with the cavities.

The two heads are interconnected and braced by means of a rod 44, secured with pins 45.

Cavity 40 communicates with the interior of yoke segment 12, while cavity 42 communicates with the interior of yoke segment 14.

Heads 36, 38 are provided with opposed pairs of sockets 46, 48, and 50, 52 respectively. Socket 46 communicates with an aligned transverse bore 54 of somewhat restricted cross sectional diameter while socket 50 communicates with a similar bore 56.

Socketpairs 46, 48 and 50, 52 receive bushing pairs 58, 60 and 62, 64, respectively.

A cross conduit 66 is rotatably mounted in opposed pairs of bushings 58, 60. This conduit has one or more rows of perforations 68 directed outwardly. It is open at its ends. One of its ends communicates with cavity 42 in head 38.

Means are provided for rotating cross conduit 66 so that perforations 68 are directed outwardly at the desired angle.

In the illustrated form of the invention, such means comprise a short shaft 70 received rotatably in bore 54 with its end pressed into and frictionally engaging the adjacent end of cross conduit 66. Shaft 70 has a head 72 which enables manual adjustment of the position of the shaft, and hence of cross conduit 66, as required to position orifices 68 at the desired angle.

Although one cross conduit 66 may suffice for some purposes, it is preferred to provide the air shield of my invention with two companion cross conduits. Accordingly there is provided a second cross conduit 74 having one or more rows of orifices 76 along its length.

The ends of cross conduit 74 are rotatably mounted in the opposed pair of bushings 62, 64. A short shaft 78 rotates in bore 56 and is pressed into the end of cross conduit 74. Hexagonal head 80 on the shaft enables manual adjustment of the cross conduit.

OPERATION

A typical means of operating the hereindescribed air shield is as follows:

When using the shield on the job, yoke 10 is slipped over the head and brought to rest on the neck and shoulders of the operator. It may be held in place by taping or pinning it to the chest area.

Next flexible hose 26 is attached to on-off valve 30.

Next valve 30 is opened and the air pressure set by holding the hand 10 or 12 inches away from cross conduits 66, 74, and then adjusting the pressure regulator with which the system is equipped until air jets of suitable itensity are felt. Running adjustments of pressure may be made as required during the operational period.

When the air shield is not required during the work day, the operator may separate tube 26 through the quick disconnect fitting, allowing the hose to dangle in back of him, or tucking the loose end under his belt, or into one of his back pockets. The tube may be quickly connected again when the welding operation is resumed.

During welding the effect illustrated in FIG. 1 is present. The air jets are directed against the fumes arising from the work and effectively screen them from the vicinity of the face of the operator. After the welding operation has been completed, the air shield is still effective, even though the welder's hood has been raised.

Having thus described my invention in preferred embodiment, I claim:

1. An air shield comprising:
   a. a conduit dimensioned and contoured to be worn about the neck of an operator exposed to noxious fumes,
   b. connecting means for connecting the conduit to a source of air under a predetermined pressure,
   c. along the length of the conduit a plurality of openings communicating with the conduit interior and arranged to provide, when supplied with air under pressure, a plurality of air jets directed outwardly and forming an air curtain in front of and moving outwardly from the face of the operator, thereby dispersing the fumes and minimizing the hazard thereof,
   d. the conduit being in the form of a loop adapted to encircle the neck and said plurality of openings being disposed at circumferentially spaced intervals about the loop to provide, when supplied with air under pressure, a plurality of air jets forming an air curtain moving peripherally outward from around the neck of the operator.

2. The air shield of claim 1 wherein the conduit is in the form of a yoke adapted to encircle the neck with the ends directed forwardly, and including at least one cross piece interconnecting the ends of the yoke and comprising a perforated conduit communicating with the yoke.

3. The air shield of claim 1 wherein the conduit is yoke-shaped with ends adapted to be directed forwardly of the wearer and including a connecting bar connecting the ends of the yoke and a pair of perforated conduits mounted between the open ends of the yoke substantially parallel to the bar and communicating with the yoke interior.

4. The air shield of claim 1 wherein the conduit is contoured in the form of an open ended loop dimensioned to encircle the neck of the operator with the open ends directed forwardly, a perforated pipe interconnecting the open ends of the loop and communicating therewith, and mounting means rotatably mounting the pipe for rotating the pipe axially to a selected position of adustment of the perforations therein.

5. An air shield comprising:
 a. a conduit dimensioned and contoured to be worn about the neck of an operator exposed to noxious fumes,
 b. Connecting means for connecting the conduit to a source of air under a predetermined pressure,
 c. along the length of the conduit a plurality of openings communicating with the conduit interior and arranged to provide, when supplied with air under pressure, a plurality of air jets directed outwardly and forming an air curtain in front of and moving outwardly from the face of the operator, thereby dispersing the fumes and minimizing the hazard thereof,
 d. the conduit being contoured in the form of an open ended loop dimensioned to encircle the neck of the operator with the open ends directed forwardly, and including a perforated pipe interconnecting the open ends of the loop and communicating therewith, and mounting means rotatably mounting the pipe for rotating the pipe axially to a selected position of adjustment of the perforations therein,
 e. the ends of the conduit mounting hollow heads having inwardly directed sockets, the sockets receiving the ends of the pipe and providing the rotatable mounting therefor.

6. The air shield of claim 5 including manually operated pipe adjusting shaft means rotatably mounted in at least one of the heads and penetrating the end of the pipe, frictionally engaging the same.

* * * * *